Patented Sept. 11, 1951 2,567,769

UNITED STATES PATENT OFFICE 2,567,769

ALKALINE EARTH OXYSULFIDE PHOSPHOR

Richard Beaumont Head, Hove, England, assignor to Cinema-Television Limited, London, England, a corporation of England No Drawing. Application February 19, 1948, Serial No. 9,635. In Great Britain February 20, 1947

10 Claims. (Cl. 252—301.4)

This invention relates to improvements in luminescent materials and methods of making such materials.

One object of the invention is to make a luminescent material which possesses a very short afterglow period under stimulation by cathode rays. The short afterglow period visualized is comparable with that of zinc-activated zinc oxide, but the luminescent material in accordance with the present invention has the advantages, as compared with zinc-activated zinc oxide, of a higher chemical stability under cathode ray stimulation, and also a higher efficiency.

Another object of the invention is to make a luminescent material containing sulphur which shows a much smaller change of afterglow constants with current density than zinc or zinc-cadmium sulphides.

According to the invention, a luminescent material comprises as essential elements, an alkaline earth metal, a rare earth, oxygen, and sulphur.

Again according to the invention there is provided a method of making a luminescent material which consists in mixing together sulphur, a rare earth compound and an alkaline earth compound including oxygen, and heating.

Again according to the invention, a method of making a luminescent material consists in mixing together sulphur, a rare earth compound and an alkaline earth compound including oxygen, either the rare earth compound or alkaline earth compound or both being in the form of a solution, drying the resultant mixture, and firing at a temperature between the limits of 600° C. and 1500° C.

According to a feature of the invention, a finely divided compound of an alkaline earth metal, and finely divided sulphur are mixed with a solution of a cerium compound.

According to a further feature of the invention, the compound of the alkaline earth metal comprises a calcium hydroxide and the cerium compound comprises cerous nitrate.

The properties of some sulphides depend on the presence of fluxes, which affect the spectral distribution of the emitted light, the length and color of phosphorescence, efficiency, and stability, and the inclusion of fluxes to promote crystallization may be used in the preparation of many luminescent materials. Materials prepared in accordance with the present invention do not require the addition of any fluxes, but it is found convenient to include a small percentage of a single flux in the final form of calcium fluoride (less than 0.25%) in order that the physical properties of the powder shall be suitable for making cathode ray screens in accordance with British Patent No. 586,524.

As compared to alkaline earth sulphides activated with rare earths, the present invention relates to materials containing an appreciable amount of oxygen, and prepared in a special manner, as the useful properties of the material depend on the method of preparation.

Calcium oxysulphides activated with cerium may be manufactured in accordance with the invention in such a way that the efficiency is comparable to that of silver activated zinc sulphide (i. e. the efficiency may be ⅕ to ½ or more of the efficiency of the latter substance). In this case the afterglow is rather longer than that of the somewhat less efficient serium activated materials described in our preferred method. The stability under cathode ray stimulation is high, but the materials decompose quickly if exposed to moist air, and they cannot be used in any application requiring appreciable quantities of water (such as settling screens or spraying on to a wet binder).

The spectral distribution depends on the amount of activator, the firing temperatures, and the amount of sulphur contained. Two bands appear to be emitted, a yellow band characteristic of CaO(Ce) and a green band.

Increasing the amount of activator, increasing the firing temperature, and decreasing the sulphur content all have the effect of accentuating the yellow portion of the spectrum and somewhat decreasing the afterglow, and oxysulphides may be prepared which fluoresce yellow, yellow-green, green, very pale green or bluish green.

The afterglow curves of the materials generally show the very rapid initial decay characteristic of some simple oxides combined with a very long dim afterglow "tail," of usually negligible intensity.

An advantage of the material over silver activated blue fluorescing zinc sulphide with nickel killer is that apart from an intrinsically shorter afterglow, the correction applied in cathode ray tubes for caption scanning or transmitting film does not alter very much with current density, i. e., when focus is altered. In the case of blue zinc sulphide, it is well known that those parts of the screen well in focus (i. e., higher current density) possess an effectively shorter afterglow and that the correction depends largely upon the focus. With the oxysulphides, however, manufactured in accordance with the invention, it is easier to obtain correction over the whole picture, and variations of focus have a much smaller effect.

While cerium has so far given us the most useful result when used as an activator, other rare earths may be used, with the exception of scandium, which gives a longer afterglow. Also other alkaline earths may be chosen. A few examples are given in the following table:

| Material | Activator | General Color of Fluorescence under Cathode Rays |
| --- | --- | --- |
| CaO.CaS | Cerium | Green to green-yellow. |
| Do | Yttrium | Cyan. |
| Do | Thorium | Blue to Cyan. |
| Do | Dysprosium | White to light buff. |
| SrO.SrS | Cerium | Cyan. |
| Do | Yttrium | Light blue. |

The fluorescent spectra consist in some of these cases as combinations of lines and bands, and the body colors of the resulting powders may vary from pale pink to white or (in the case of CaO,CaS(Ce)), to a light lemon yellow, similar in color to pure cerium dioxide.

Many possible methods exist for the formation of these compounds, including synthesis from the elements, or heating an alkaline earth salt in a stream of sulphur vapor or of a sulphur-containing gas.

In a preferred method of preparing the material according to the invention, finely divided calcium hydroxide, low in carbonate, and of great purity is mixed with finely divided iron-free sulphur which has preferably been distilled at least once, and a small quantity, not more than 0.25% of purest ammonium fluoride. A proportion of rare earth salt in the form of an aqueous solution is added to give a concentration of rare earth of between 0.05% to 0.5%. We consider 0.2% to be a useful quantity in the case of cerium. The dilution of the rare earth salt is made such that the whole of the material will be completely moistened to facilitate the uniform distribution of the rare earth compound throughout the mixture. The resulting wet paste is dried and heated very gradually to about 600° C. for a period of 2 hours in an inert gas such as nitrogen. During this heating, excess sulphur is driven off in the form of the oxides of sulphur and sulphides and polysulphides of hydrogen, and chemical changes take place. The residue is then lightly ground, and heated to 1100° C. in an inert atmosphere for two hours. During this heating crystallization takes place, together with a limited amount of further chemical change. It is then ground completely in a ball mill, and annealed to about 800° C. for 45 minutes. The resultant cake possesses a uniform light yellow body color, and is easily broken down to powder.

Further preferred methods (which can be carried out with any alkaline earth, but are particularly applicable to strontium, since the latter metal possesses a soluble octahydrate, and a solid monohydrate fusing at a comparatively low temperature), are as follows:

(a) A suitable strontium salt, such as the nitrate, to which has been added the cerium salt, and the ammonium fluoride as previously indicated, is fired in accordance with British Patent 616,838, resulting in the formation of activated strontium oxide containing the flux, and then reheating this with sulphur as described in the preferred method hereinbefore described.

(b) A method which we prefer to use also in connection with the manufacture of strontium oxysulphides: The calculated amount of strontium monohydrate low in carbonate, which is a solid and of the requisite purity, is placed in an alumina crucible. To this are added the calculated quantities of solutions of rare earth nitrates, and ammonium fluoride, and the crucible fired in accordance with British Patent 616,838, resulting in activated strontium oxide containing a flux. Owing to the difficulties of preparing very pure strontium hydroxide, which, because of its strong alkalinity tends to dissolve traces of impurities from the vessels used, a purified nitrate may be used in place of the hydroxide. This will, of course, melt during the firing with the evolution of nitrous fumes and water.

The strontium oxide obtained from either of these processes, (a) or (b), is heated with sulphur, first at 600° C., then at 1100° C. or thereabouts, and finally annealed if necessary, as described in the first preferred process. It will be seen, in this last case, that up to four firings may be necessary in order to prepare the final material.

As regards the cerium activated calcium oxysulphide described in our first preferred process, the color of fluorescence is green; and although this material is not the most efficient preparation, it combines a reasonably good efficiency with a shorter afterglow. This material hardly fluoresces under ultra-violet excitation. The decay of luminescence possesses a very steep initial drop, dropping to less than 10% of its initial brightness in one microsecond, and although a very long dim afterglow "tail" can be seen in complete darkness, this is of negligible intensity.

It must be understood that only certain rare earth and alkaline earth compounds are suitable for use in the method in accordance with the invention. For example, it is preferred to use the hydroxides, oxides or nitrates of the rare earths and the hydroxides of the alkaline earth metals. It is obviously impossible in most cases to use compounds of the rare earth which contain a heavy metal in the radical as this heavy metal would have the effect of poisoning the luminescent material.

It will, of course, be understood that the invention is not limited to the use of one alkaline and/or one rare earth in a single material. For example, a calcium-strontium oxy-sulphide activated with one or more of the elements yttrium, cerium, and thorium, is a material which can be prepared without departing from the spirit of the invention.

What is claimed is:

1. A material luminescent to cathode rays comprising an oxysulphide of an alkaline earth metal activated by a rare earth compound selected from the group consisting of cerium compounds, yttrium compounds, thorium compounds and dysprosium compounds in a proportion so as to give a concentration of rare earth in the material of between 0.05% and 0.5% by weight.

2. A material as set forth in claim 1 in which the alkaline earth metal is calcium.

3. A material as set forth in claim 1 in which the alkaline earth metal is strontium.

4. A method of making a material luminescent to cathode rays which comprises the following steps: mixing together an excess of sulphur and an alkaline earth metal compound selected from the group consisting of the oxides and hydroxides of calcium and strontium, activating said mixture by a rare earth compound selected from the group consisting of cerium, yttrium, thorium and dysprosium in a proportion so as to give a concentration of rare earth in the material of between 0.05% and 0.5% by weight, at least one of said compounds being in aqueous solution and both compounds being free from heavy metals, drying the resultant mixture, and heating the mixture to a temperature between the limits of 600° C. and 1500° C. until excess sulphur is driven off and reaction is completed.

5. A method as set forth in claim 4 in which the mixture forms a paste which is dried and is first heated gradually to about 600° C. for a period of about two hours in an inert gas until excess sulphur is driven off and reaction has taken place, the product being comminuted and heated to about 1100° C. in an inert atmosphere for about two hours, until crystallization takes place.

6. A method as set forth in claim 4 in which the alkaline earth metal compound and rare earth compound are heated to form an alkaline metal oxide containing the rare earth, and this compound is mixed with sulphur and heated to form an oxysulphide.

7. A method of making a material luminescent to cathode rays which comprises the following steps: mixing together sulphur and an alkaline earth metal compound from the group consisting of the oxides and hydroxides of calcium and strontium, activating said mixture by a rare earth compound selected from the group consisting of cerium, yttrium, thorium and dysprosium, said activator being present in a concentration of between 0.05% and 0.5% by weight, at least one of said compounds being in aqueous solution and both compounds being free from heavy metals, adding a flux in a proportion of not more than 0.25% of the dry materials by weight, drying the resultant mixture, and heating the mixture to a temperature between the limits of 600° C. and 1500° C. until the excess sulphur is driven off and the reaction is completed.

8. A method as set forth in claim 7, and in which the flux comprises calcium fluoride.

9. A method as set forth in claim 7, and in which the flux comprises ammonium fluoride.

10. A material luminescent to cathode rays comprising calcium oxysulphide activated by cerium in a proportion so as to give a concentration of cerium in the material of 0.2% by weight.

RICHARD BEAUMONT HEAD.

No references cited.